US011850759B2

(12) United States Patent
Cha et al.

(10) Patent No.: US 11,850,759 B2
(45) Date of Patent: Dec. 26, 2023

(54) CONTROL METHOD AND SYSTEM FOR ROBOT

(71) Applicant: NAVER LABS CORPORATION, Seongnam-si (KR)

(72) Inventors: Seijin Cha, Seongnam-si (KR); Kahyeon Kim, Seongnam-si (KR)

(73) Assignee: NAVER LABS CORPORATION, Gyeonggi-Do (KR)

( * ) Notice: Subject to any disclaimer, the term of this patent is extended or adjusted under 35 U.S.C. 154(b) by 198 days.

(21) Appl. No.: 17/381,787

(22) Filed: Jul. 21, 2021

(65) Prior Publication Data
US 2022/0063107 A1    Mar. 3, 2022

(30) Foreign Application Priority Data

Aug. 28, 2020   (KR) ........................ 10-2020-0109614

(51) Int. Cl.
*B25J 9/16* (2006.01)
*B25J 19/02* (2006.01)

(52) U.S. Cl.
CPC ........... *B25J 9/1697* (2013.01); *B25J 9/1664* (2013.01); *B25J 9/1679* (2013.01); *B25J 19/023* (2013.01)

(58) Field of Classification Search
CPC ...... B25J 9/1697; B25J 9/1664; B25J 9/1679; B25J 19/023; G05D 1/0011; G05D 1/0246

See application file for complete search history.

(56) References Cited

U.S. PATENT DOCUMENTS

| | | | | |
|---|---|---|---|---|
| 2014/0365060 | A1* | 12/2014 | Yamamoto | G05D 1/0016 701/23 |
| 2018/0259973 | A1* | 9/2018 | Maruo | G05D 1/102 |
| 2018/0311820 | A1* | 11/2018 | Fritz | G05D 1/0274 |
| 2019/0011926 | A1* | 1/2019 | Konishi | B60L 53/00 |
| 2021/0373576 | A1* | 12/2021 | Sohn | G05B 19/4155 |

FOREIGN PATENT DOCUMENTS

| | | |
|---|---|---|
| JP | 2005-329515 A | 12/2005 |
| JP | 2015-001863 A | 1/2015 |
| JP | 2018190379 A | 11/2018 |
| JP | 2019-032806 A | 2/2019 |
| JP | 2020/032529 A | 11/2021 |
| KR | 100702147 B1 | 3/2007 |
| KR | 10-2019-0096849 A | 8/2019 |

OTHER PUBLICATIONS

Korean Office Action dated Nov. 11, 2021, for corresponding KR Patent Application No. 10-2020-0109614.
Korean Office Action dated Nov. 12, 2021, for corresponding KR Patent Application No. 10-2021-0082283.
Japanese Office Action dated Oct. 25, 2022 for corresponding JP application No. 2021- 133894.

* cited by examiner

*Primary Examiner* — Abby Y Lin
*Assistant Examiner* — Dylan Brandon Mooney
(74) *Attorney, Agent, or Firm* — Harness, Dickey & Pierce, P.L.C.

(57) ABSTRACT

A control method and system for a robot. The robot control method includes allocating a task to a robot, the task associated with a place and a target user, determining a location of the target user based on an image received from a camera, the camera being arranged in a space including the place, and controlling a performance time of the task based on the location of the target user and the place.

18 Claims, 10 Drawing Sheets

FIG. 1
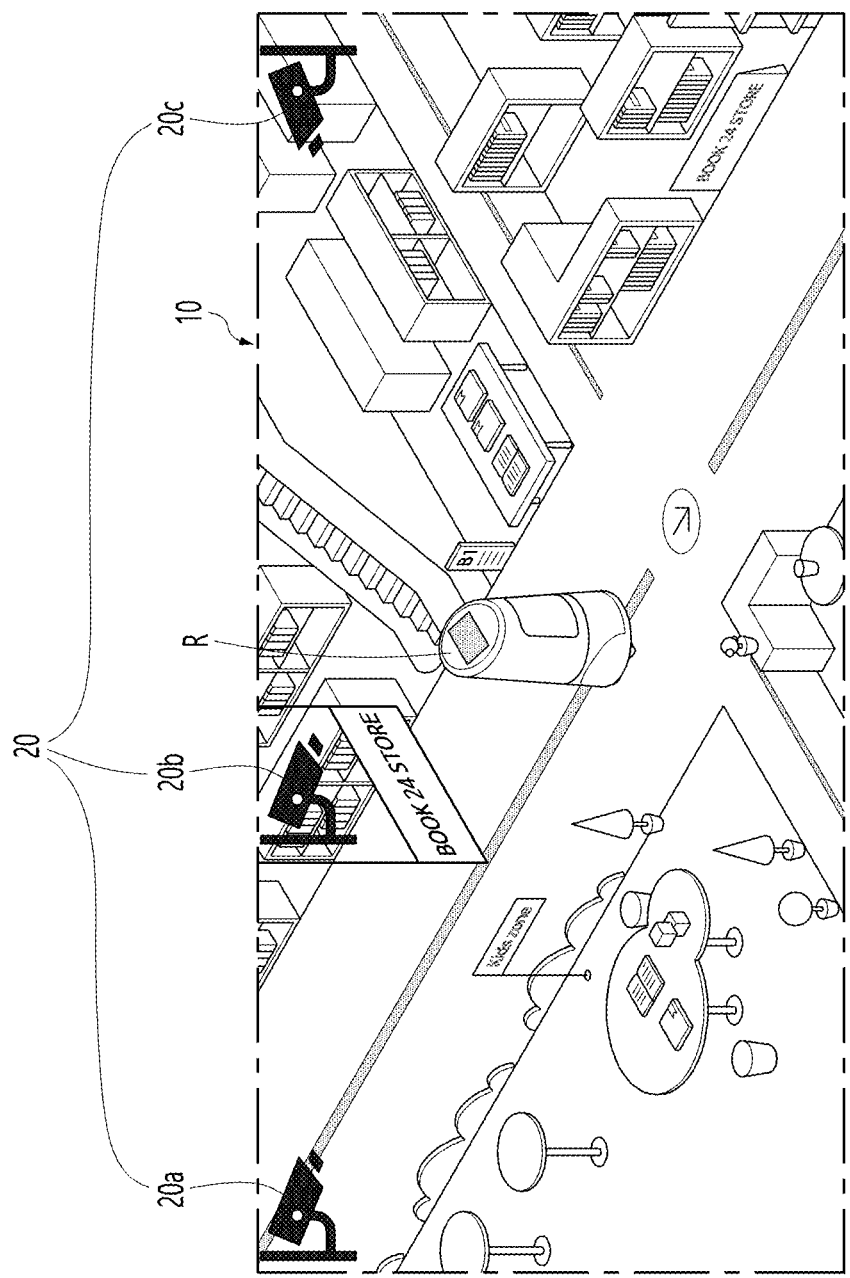
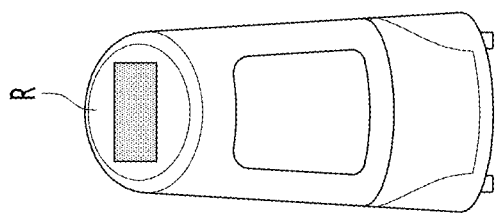

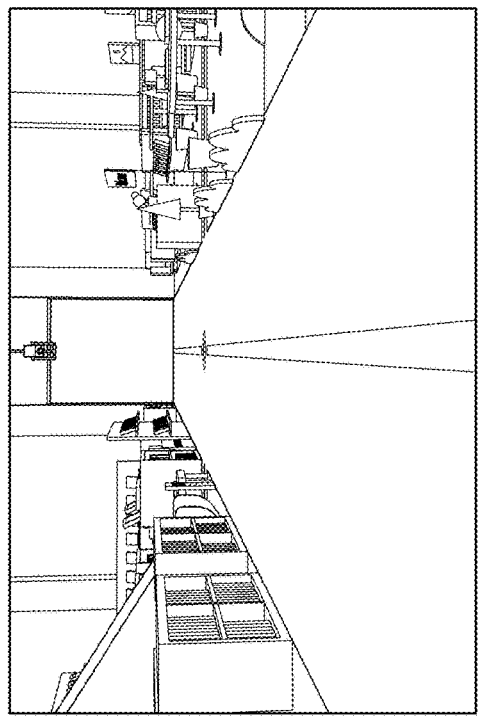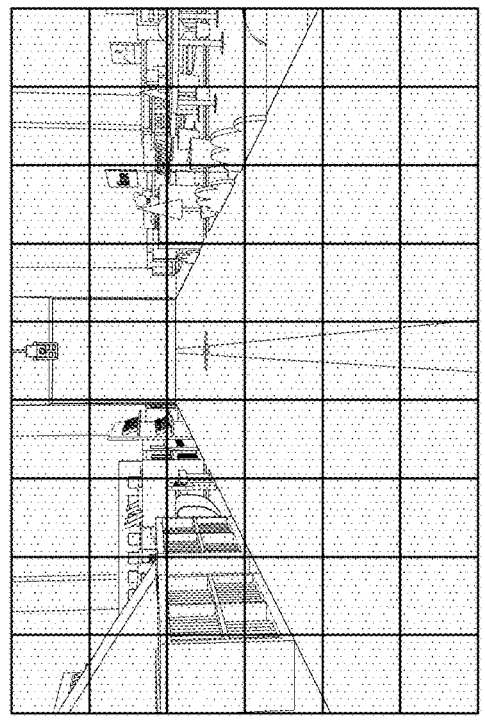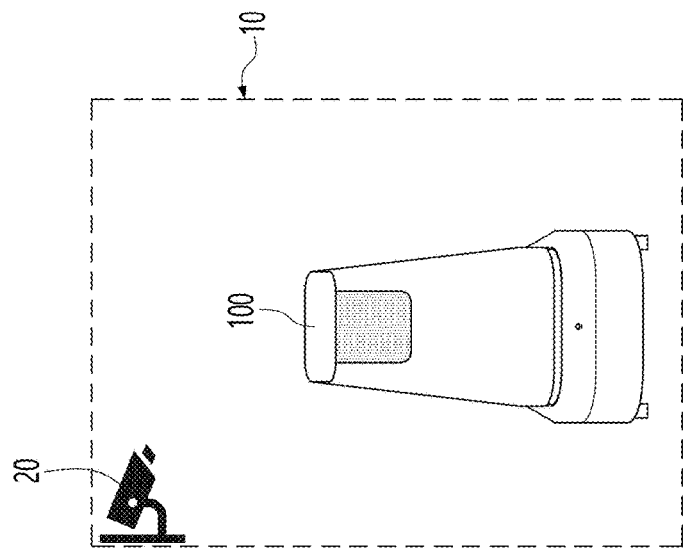

FIG. 8A

| RELATIVE LOCATION | WAITING TIME |
|---|---|
| SAME FLOOR + WITHIN 10M | ADDITIONAL WAITING FOR 5 MINUTES |
| WITHIN 5 FLOORS | ADDITIONAL WAITING FOR 10 MINUTES |
| MORE THAN 5 FLOORS | NO ADDITIONAL WAITING |

FIG. 8B

| RELATIVE LOCATION | SITUATION INFORMATION OF TARGET USER | WAITING TIME |
|---|---|---|
| SAME FLOOR + WITHIN 10M | MOVING TOWARDS SPECIFIC PLACE | ADDITIONAL WAITING FOR 5 MINUTES |
| | UNDER CONVERSATIONS WITH THIRD PARTY AT CORRIDOR | ADDITIONAL WAITING FOR 10 MINUTES |
| | UNDER MEETING AT CONFERENCE ROOM | NO ADDITIONAL WAITING |
| | UNDER CONVERSATIONS WITH THIRD PARTY AT CAFE | ADDITIONAL WAITING FOR 10 MINUTES |
| WITHIN 5 FLOORS | MOVING TOWARDS SPECIFIC PLACE | ADDITIONAL WAITING FOR 10 MINUTES |
| | UNDER CONVERSATIONS WITH THIRD PARTY AT CORRIDOR | ADDITIONAL WAITING FOR 5 MINUTES |
| | UNDER MEETING AT CONFERENCE ROOM | NO ADDITIONAL WAITING |
| | UNDER CONVERSATIONS WITH THIRD PARTY AT CAFE | NO ADDITIONAL WAITING |
| MORE THAN 5 FLOORS | MOVING TOWARDS SPECIFIC PLACE | ADDITIONAL WAITING FOR 15 MINUTES |
| | UNDER CONVERSATIONS WITH THIRD PARTY AT CORRIDOR | NO ADDITIONAL WAITING |
| | UNDER MEETING AT CONFERENCE ROOM | NO ADDITIONAL WAITING |
| | UNDER CONVERSATIONS WITH THIRD PARTY AT CAFE | NO ADDITIONAL WAITING |

CONTROL METHOD AND SYSTEM FOR ROBOT

CROSS-REFERENCE TO RELATED APPLICATION

Pursuant to 35 U.S.C. § 119(a), this application claims the benefit of the earlier filing date and the right of priority to Korean Patent Application No. 10-2020-0109614, filed on Aug. 28, 2020, the contents of which is incorporated by reference herein in its entirety.

BACKGROUND

1. Technical Field

Some example embodiments relate to robot control, and more particularly, to a control method and system for a robot, capable of efficiently controlling a task allocated to a robot.

2. Description of the Related Art

As technology advances, various service devices emerge, especially in recent years, technology development for robots that perform various tasks or services is actively ongoing.

Furthermore, recently, as artificial intelligence technologies and cloud technologies have evolved, the utilization of robots is gradually increased.

Recently, robots replace a human's task or operation. Especially, methods for directly providing services to humans are being actively researched. In order to provide various tasks or services with a robot, it is important to control the robot accurately and efficiently.

For instance, methods to recognize a user registered to a database based on a CCTV image by a robot, and to provide a service based on the recognized user, are known. In case of providing a service to a user by a robot, the service should be provided more efficiently. Thus, techniques to provide a service more efficiently are being actively developed and researched.

In order to operate a robot more efficiently and to provide a more meaningful service to a user, it would be desirable to determine a method for a robot to provide a service more flexibly by considering a user's situation.

SUMMARY

Therefore, an aspect of some example embodiments is to provide a control method and system for a robot.

More specifically, some example embodiments provide a control method and system for a robot, capable of controlling a task allocated to a robot with consideration of a user's situation.

Some example embodiments provide a control method and system for a robot, capable of more flexibly controlling a task allocated to a robot based on a user's situation.

In order to achieve these and other advantages and in accordance with some example embodiments, as embodied and broadly described herein, there is provided a robot control method, including allocating a task to a robot, the task associated with a place and a target user, determining a location of the target user based on an image received from a camera, the camera being arranged in a space including the place, and controlling a performance time of the task based on the location of the target user and the place.

In order to achieve these and other advantages and in accordance with some example embodiments, as embodied and broadly described herein, there is also provided a robot control system, including a communication unit configured to communicate with a robot, and a controller configured to allocate a task to the robot, the task associated with a place and a target user, determine a location of the target user based on an image received from a camera, the camera being arranged in a space including the place, and control a performance time of the task based on the location of the target user and the place.

In order to achieve these and other advantages and in accordance with some example embodiments, as embodied and broadly described herein, there is still also provided a robot, including a communication unit configured to receive location information of a target user from a remote control system, the target user corresponding to a task, a driving unit configured to move the robot to a place associated with the task, and a controller configured to calculate a distance between the target user and the place based on the location information, and extend a scheduled time for performing the task by an additional task performance time based on the distance being within a reference range.

As aforementioned, in the robot control method and system according to some example embodiments, a user's location may be certified by using the camera installed in the space, and control over a task execution time may be performed based on a distance between the user and a task execution place.

In the robot control method and system according to some example embodiments, in a case that the user's location is not far from the task execution place, the robot may be controlled to complete the task for the user by waiting for the user, even if the scheduled time expected to perform the task lapses.

Thus, the robot may complete the task for the user by waiting for the user for an additional waiting time. Further, in the robot control method and system according to some example embodiments, as the robot allocated with the task is controlled to complete performance of the task, the robot may be efficiently operated.

BRIEF DESCRIPTION OF THE DRAWINGS

FIGS. 1 and 2 are conceptual views for explaining a control method and system for a robot according to some example embodiments;

FIGS. 4A, 4B and 4C are conceptual views for explaining a robot position estimation method in a control method and system for a robot according to some example embodiments;

FIGS. 6, 7, 8A, 8B, 9A and 9B are conceptual views for explaining a control method and system for a robot according some example embodiments.

DETAILED DESCRIPTION

Description will now be given in detail according to some example embodiments disclosed herein, with reference to the accompanying drawings. For the sake of brief description with reference to the drawings, the same, similar or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In some example embodiments, that which is well-known to one of ordinary skill in the relevant art has generally been omitted for the sake of brevity. The accompanying drawings are used to help easily understand various technical features and it should be understood that some example embodiments presented herein are not limited by the accompanying drawings. As such, some example embodiments should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, operations, functions, several components, or combinations thereof, disclosed in the specification, and it is also understood that greater or fewer features, numbers, operations, functions, several components, or combinations thereof may likewise be utilized.

Figure 2:
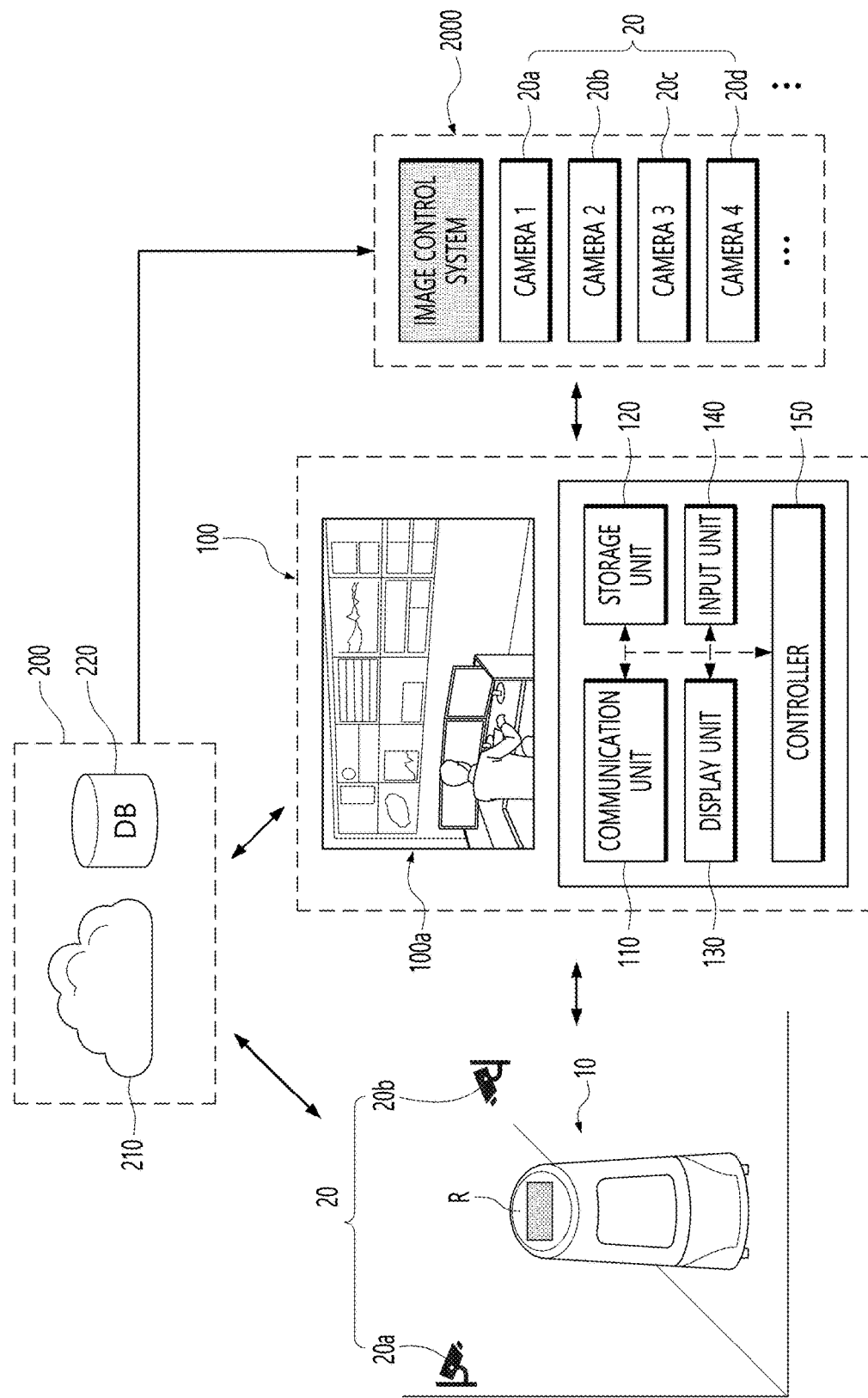
Figure 3A:
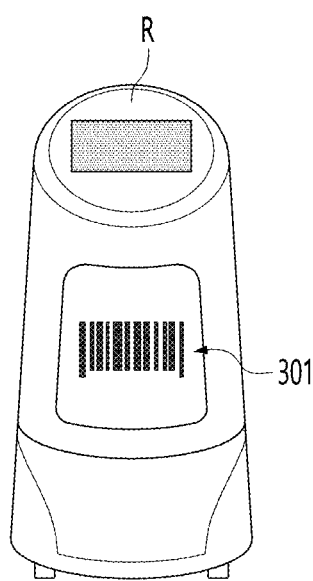
FIGS. 3A, 3B and 3C are conceptual views for explaining a robot recognition method in a control method and system for a robot according to some example embodiments.
Figure 3B:
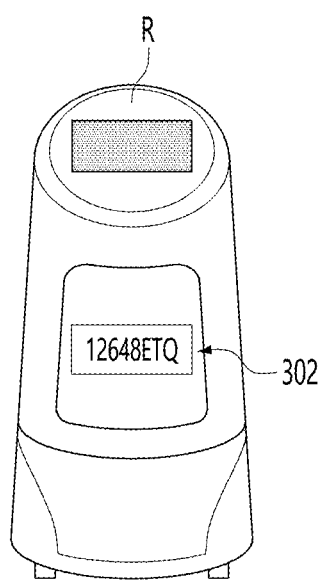
Figure 3C:
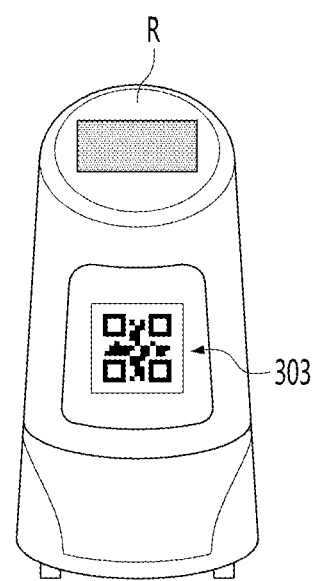

Some example embodiments provide a control method and system for a robot, and more particularly, provides a control method and system capable of controlling a task allocated to a robot with consideration of a user's situation. Hereinafter, a space where a robot drives and a robot control system surrounding the space will be described with reference to the accompanying drawings. FIGS. 1 and 2 are conceptual views for explaining a control method and system for a robot according to some example embodiments. FIGS. 3A, 3B and 3C are conceptual views for explaining a robot recognition method in a control method and system for a robot according to some example embodiments. And FIGS. 4A, 4B and 4C are conceptual views for explaining a robot position estimation method in a control method and system for a robot according to some example embodiments.

As technology advances, the utilization of robots is gradually increasing. Robots have traditionally been used in special industries (e.g., industrial automation related fields), but are increasingly transformed into service robots that may perform useful tasks for humans or facilities.

A robot capable of providing such diverse services may be configured to drive in the space 10, as shown in FIG. 1, to perform assigned tasks. There is no limit to the type of space in which the robot (R) drives, and it may be made to drive at least one of indoor and/or outdoor spaces. For example, indoor spaces may be a variety of spaces, such as department stores, airports, hotels, schools, buildings, subway stations, train stations and/or bookstores. Thus, the robot (R) may be arranged in various spaces to provide useful services to human beings. The robot in accordance with some example embodiments may be referred to variously, for instance, an unmanned moving machine, an autonomous moving machine, etc.

As shown in FIG. 1, a camera 20 may be placed in the space 10 where the robot is located. As shown, the number of the cameras placed in the space 10 is unlimited. Multiple cameras 20a, 20b, and 20c may be placed in the space 10, as shown. The types of the cameras 20 placed in the space 10 may vary, and a closed circuit television (CCTV) placed in the space 10 may be utilized.

The robot (R) which drives the space 10 may include a service robot for providing a service to a user. The service provided to a user by the robot (R) may be various. For instance, the robot (R) may deliver objects (e.g., postal matters, logistics, etc.), and/or may serve beverages. The robot (R) which provides such services may be configured to directly meet a user to which a service is to be performed or provided (hereinafter, will be referred to as a "target user") in the space 10, and to provide a service to the target user.

The operation to provide a service by the robot (R) may be understood as performance of a task by the robot (R). That is, the robot (R) is configured to provide a service to the target user by performing an allocated task. Hereinafter, for convenience of explanations, "providing a service by the robot (R)" will be expressed as "performing a task by the robot (R)".

For this, a scheduled time to perform a task to the target user may be set to the robot (R).

The scheduled time to perform a task may be expressed as a "predetermined time" (e.g., a predetermined or alternatively, given time) or a "reservation time". Such a predetermined time or reservation time may be determined based on a selection by the target user, or a control of a robot control system 100. For instance, the target user may perform a reservation that the robot (R) is to perform a specific task (e.g., a logistics delivery task) for the target user, to the robot control system 100. The target user may input a service providing time according to a specific task (e.g., 3:00 PM), to the robot control system 100, through an electronic device. Such a specific time may be expressed as the aforementioned "predetermined time" or "reservation time". Also, it is possible that the target user directly transmits scheduled time information to the robot (R) through the electronic device, without transmitting scheduled time information via the robot control system 100.

The robot (R) may be programmed to receive information on a scheduled time for task performance through various paths, and to perform a task at the corresponding time.

Hereinafter, descriptions will be explained under an assumption that the robot (R) receives information on a scheduled time for task performance, from the robot control system 100. The robot control system 100 may mean a central system which controls various operations related to the robot (R).

The robot (R) may be configured to receive time information on a schedule time for task performance, from the robot control system 100, and to perform a task to the target user at the scheduled time. Completion of a task allocated to the robot (R) may mean provision of a service corresponding to the task to the target user. Thus, if the robot (R) does not meet the target user at a schedule time, task performance for the target user may not be completed. The target user may move to a specific place where a service is to be provided, at a scheduled time. The target user may arrive at the specific place earlier or later than the scheduled time, due to various situations. In a case that the target user arrives at the specific place earlier than the scheduled time, the target user may be provided with a service from the robot (R) by waiting for the robot (R) until the scheduled time. On the contrary, in a case that the target user arrives at the specific place later than the scheduled time, the target user may not be provided with a service from the robot (R). For instance, in a case that the robot (R) is controlled to perform a task allocated thereto at a scheduled time, if the robot (R) does not meet the target user at the scheduled time, the robot (R) may cancel task provision to the target user or may return to a preset or alternatively, given place. In this case, even if the target user arrives at the specific place, the target user may not be provided with a service from the robot (R) because the task allocated to the robot (R) is cancelled.

It will be assumed that the target user is able to arrive at a specific place within a threshold time from a scheduled time, since the target user is positioned near the specific place. In this case, in the aspect of the operation of the robot (R), it may be efficient that a task for the target user is performed by exceeding the scheduled time. In the aspect of the robot (R), if task performance is not completed by the robot (R) which has already moved to the specific place, the corresponding robot (R) or another robot should move again to the specific place for the corresponding task. This may cause the task allocated to the robot to be increased. Also, in the aspect of the target user, the target user may move to the specific place to meet the robot (R). In this case, if the task for the target user who has not arrived at the specific place at the scheduled time is canceled at the robot (R), the target user may waste time used to meet the robot (R). Further, it may be troublesome for the target user to perform a service reservation, etc. in order to be provided with a service from the robot (R).

In some example embodiments, "task completion by the robot (R)" may include a situation that the robot (R) has met the target user. And "task completion by the robot (R)" may mean that the robot (R) has met the target user, and then has completed providing a service corresponding to an allocated task (e.g. an object delivery). Thus, if the robot (R) has not met the target user or has not provided a service to the target user, the robot (R) may be in a "non-completion state of a task".

Like this, in a case that a task allocated to the robot (R) is completed through a direct meeting between the robot (R) and a person, it would be desirable to control a task performance time at the robot (R), with consideration of a situation of a target user to which a service is to be provided according to a task. Thus, some example embodiments provide a control method and system for a robot, capable of controlling a task allocated to a robot with consideration of a user's situation.

As shown in FIG. 2, the robot control system 100 in accordance with some example embodiments may include at least one of a communication unit 110, a storage unit 120, a display unit 130, an input unit 140, and/or a controller 150.

The communication unit 110 may be configured to communicate with a variety of devices placed in the space 10, in a wireless and/or wired manner. The communication unit 110 may communicate with at least one of the robot (R), an external server 200 and/or an image control system 2000 as shown in the drawings.

For instance, the communication unit 110 may receive data (e.g., images captured from the robot (R), sensing data, etc.) from the robot (R), and/or may transmit a control command to the robot (R).

Furthermore, the communication unit 110 may perform direct communication with the camera 20 placed in the space 10. Furthermore, the communication unit 110 may be configured to communicate with the image control system 2000 that controls the camera 20. In a case that the communication unit 110 communicates with the image control system 2000, the robot control system 100 may receive an image captured (or received) by (from) the camera 20, from the image control system 2000, through the communication unit 110.

Furthermore, the communication unit 110 may be configured to communicate with at least one external server (or external storage unit 200). The external server 200 may be configured to include at least one of a cloud server 210 and/or a database 220, as shown. The external server 200 may be configured to perform at least a part of the controller 150. In other words, performance such as data processing or data computation may be performed on the external server 200 (instead of or in addition to on the controller 150), and some example embodiments do not impose any particular restrictions on this approach.

Further, the communication unit 110 may be configured to communicate with an electronic device of a user (or a target user). A type of the electronic device is limitless, and may be a smartphone, a tablet PC, etc.

The communication unit 110 may support a variety of communication methods according to a communication specification of a device with which it communicates.

For instance, the communication unit 110 may be configured to communicate with a device (including a cloud server) located in and out of the space 10, using at least one of WLAN (Wireless LAN), Wi-Fi (Wireless-Fidelity) Direct, DLNA (Digital Living Network Alliance), WiBro (Wireless Broadband), WiMAX (World Interoperability for Microwave Access), HSUPA (High Speed Uplink Packet Access), LTE (Long Term Evolution-Advanced), 5G (5th Generation Mobile Telecommunication), Bluetooth™, RFID (Radio Frequency Identification), Infrared Data Association; IrDA, UWB (Ultra-Wideband), ZigBee, NFC (Near Field Communication), and/or Wireless USB (Wireless Universal Serial Bus).

Next, the storage unit 120 may be configured to store various information. In some example embodiments, the storage unit 120 may be equipped with (e.g., within) the robot control system 100 itself. In contrast, at least a part of the storage unit 120 may mean at least one of the cloud server 210 and/or the database 220. That is, it may be understood that the storage unit 120 is sufficient if information used for robot control in accordance with some example embodiments is stored, and there is no constraint on physical space. Thus, the storage unit 120, the cloud server 210 and/or the database 220 may not be separately identified, but may all be described as the storage unit 120. The cloud server 210 may mean "cloud storage".

First, information on the robot (R) may be stored in the storage unit 120.

Information about the robot (R) may vary widely and may include, for example, i) identification information (for instance, serial numbers, TAG information, Quick Response (QR) code information, etc.) for identifying the robot (R) placed in the space 10, ii) task information assigned to the robot (R) (e.g., a task type, an operation according to a task, information on a target user to which a task is to be performed, a task performance place, a scheduled time for task performance, etc.), iii) driving path information set to the robot (R), iv) location information of the robot (R), v) status information of the robot (R) (for example, a power condition, presence of a malfunction, a battery condition, etc.), vi) image information received from the camera equipped in the robot (R), vii) operation information related to an operation of the robot (R), etc.

Next, information on the camera 20 may be stored in the storage unit 120.

The information on the camera 20 may be variable, and may include i) identification information of each camera (20a, 20b, 20c, 20d . . . ) (e.g., serial numbers, TAG information, QR code information, etc.), ii) arrangement position information of each camera (20a, 20b, 20c, 20d . . . ) (e.g., information on a specific position in the space where each camera (20a, 20b, 20c, 20d . . . ) is arranged), iii) information on an angle of view of each camera (20a, 20b, 20c, 20d . . . ) (e.g., information on a specific view in the space captured by each camera (20a, 20b, 20c, 20d . . . )), iv) position information on a region (or a space or a specific space) corresponding to an angle of view of each camera (20a, 20b, 20c, 20d . . . ), v) status information of each camera (20a, 20b, 20c, 20d . . . ) (e.g., a power condition, presence of a malfunction, a battery condition, etc.), vi) image information received from each camera (20a, 20b, 20c, 20d . . . ), etc.

The information on the camera 20 may exist in a matching manner on the basis of each camera (20a, 20b, 20c, 20d . . . ).

For instance, at least one of identification information of the specific camera 20a, position information, view angle information, status information and/or image information may exist in the storage unit 120 as matching information (e.g., corresponding to each camera 20a, 20b, 20c, 20d . . . ). Such matching information may be effectively utilized to later specify a space (or a place or a region) where a specific camera is located, and/or to identify a position of a user (e.g., a target user) positioned in a corresponding space.

Further, the storage unit 120 may store information related to a user. Such user-related information may be referred to as "user DB".

The user-related information may be also referred to as "user's identification information".

The user-related information may include at least one of a user name, a date of one's birth, an address, a phone number, an employee identification number, an ID, a facial image, bio information (fingerprint information, iris information, etc.), a user's living place in the space 10 (e. g, a working place (or a working region), a residential place, etc.), identification information of an electronic device of a user, and/or information related to a user's plan (schedule).

Next, in the storage unit 120, a map (or map information) for the space 10 may be stored. The map may be configured as at least one of a two and/or three dimensional map. The map for the space 10 may mean a map that may be utilized to check a current location of the robot (R) or a user, to establish a driving path of the robot (R), and/or to make the robot (R) drive.

In particular, in the robot control system 100 in accordance with some example embodiments, it is possible to check a location of the robot (R) based on an image received from the robot (R). To this end, the map for the space 10 stored in the storage unit 120 may consist of data that allows location estimation based on an image.

The map for the space 10 may be a map preset or alternatively, given based on Simultaneous Localization and Mapping (SLAM) by at least one robot moving in the space 10.

In addition to the types of information listed above, various information may be stored in the storage unit 120.

Next, the display unit 130 may be equipped in a device of a user or a manager who manages the robot (R) remotely, and may be installed in a control room 100a, as shown in FIG. 2. Alternatively, the display unit 130 may be a display equipped in a mobile device (e.g., the electronic device of the user). As such, some example embodiments do not have any restrictions on the type of the display unit.

Next, the input unit 140 is for inputting information from the user (or the manager), which may be a medium between the user (or the manager) and the robot control system 100. More specifically, the input unit 140 may mean an input means of receiving a control command for remotely controlling the robot (R), from the user. The user may be different from a target user who is a subject to which a service is to be performed.

There may be no specific restrictions on the type of the input unit 140, and the input unit 140 may include at least one of mechanical input means (or mechanical keys, e.g., a mouse, a joystick, physical buttons, a dome switch, a jog wheel, a jog switch, etc.) and/or touch-type input means. For example, the touch-type input means may be a virtual key, a soft key, or a visual key that is displayed on a touch screen through software processing, or may be a touch key that is placed outside of the touch screen. The virtual key or the visual key may be displayed on the touch screen in various forms, for example, graphics, texts, icons, videos, or a combination thereof. When the input unit 140 includes a touch screen, the display unit 130 may be configured as the touch screen. In this instance, the display unit 130 may perform both roles of information output and information reception.

Next, the controller 150 may be configured to control the overall operations of the robot control system 100. The controller 150 may process signals, data, information, etc. that are input and/or output through the components shown above (e.g., the communication unit 110, the storage unit 120, the display unit 130 and/or the input unit 140), or provide or process appropriate information or functions to the user.

The controller 150 may be configured to allocate a task to the robot (R). For task allocation to the robot (R), the controller 150 may transmit a control command related to a task to the robot (R), by using the communication unit 110. Such a control command may include a control to perform a task by the robot (R).

The controller 150 may perform control related to driving of the robot (R), such that the robot (R) moves to a specific place matched with a task. The controller 150 may transmit a control command corresponding to a task to the robot (R), thereby controlling the robot (R) to move to a specific place matched with the task.

The control command corresponding to a task allocated to the robot (R) may include task information. As aforementioned, the task information may include information related to at least one of a task type, an operation according to a task, information on a target user to which a task is to be performed, a task performance place (or a specific place matched with a task) and/or a scheduled time for task performance.

When the robot (R) receives the control command corresponding to a task from the controller 150, the robot (R) may move to a specific place matched with the task, in order to perform the allocated task. The controller of the robot (R) may move to the place for task performance, based on task information received from the robot control system 100.

Further, the controller 150 may perform various controls to control the robot (R) arranged at the space 10. For this, the controller 150 may recognize the robot (R) arranged in the space 10 in various manners, thereby checking a current position of the robot (R) or controlling an operation of the robot (R). Further, the controller 150 may recognize the robot (R) arranged in the space 10 in various manners, thereby managing a task allocated to the robot (R).

As shown in FIGS. 3A, 3B and 3C, identification information of the robot (R) may be extracted from an image based on an identification sign (or an identification mark) provided at the robot (R). As shown in FIGS. 3A, 3B and 3C, identification marks 301, 302, 303 of the robot (R) may include identification information of the robot. As shown, the identification marks 301, 302, 303 may be configured as barcode 301, sequence information (or serial information) 302 and QR code 303. Each of the barcode 301, the sequence information (or serial information) 302 and the QR code 303 may be configured to include identification information of the robot.

The identification information of the robot is information for discerning each robot. And even the same type, or similar types, of robots may have different identification information. The information which constitutes the identification marks may include various configurations as well as the aforementioned barcode, sequence information and/or QR code.

The controller 150 may extract identification information of the robot (R) based on the aforementioned identification marks, from an image received from the camera 20 with reference to FIG. 4A, thereby specifying the robot (R) captured by the camera 20 and checking a location of the specified robot (R) in the space 10.

In some example embodiments, a method to specify the robot (R) captured by the camera 20 may be variable. As aforementioned, the controller 150 may extract identification information of the robot (R) from an image, and specify the robot (R). Furthermore, the controller 150 may specify a current location of the robot (R) captured by the camera 20, based on at least one of an image-captured time and location information matched with the camera 20 which has captured an image.

The estimation of the location of the robot (R) may be performed by various methods as well as the aforementioned method using the camera provided in the space 10. For instance, as shown in FIGS. 4B and 4C, the robot control system 100 or the controller of the robot (R) is configured to receive images about the space 10 by using the camera (not shown) provided at the robot (R), and to perform Visual Localization to estimate the location of the robot from the received images. The camera provided at the robot may be configured to capture (or sense) images about the space 10, e.g., images around the robot.

As shown in FIG. 4B, the robot control system 100 or the controller of the robot (R) is configured to obtain an image by the camera provided at the robot (R). And the robot control system 100 or the controller of the robot (R) may estimate a current location of the robot (R) based on the obtained image.

The robot control system 100 or the controller of the robot (R) may compare the image obtained by the robot (R) with map information stored in the storage unit 120. Then, as shown in FIG. 4C, position information corresponding to the current location of the robot (R) (e.g., "section of A on the third floor (3, 1, 1)") may be extracted.

As aforementioned, the map for the space 10 in accordance with some example embodiments may be a map preset or alternatively, given based on Simultaneous Localization and Mapping (SLAM) by at least one robot moving in the space 10. Specifically, the map for the space 10 may be a map generated based on image information.

In other words, the map for the space 10 may be a map generated by a vision (or visual)-based SLAM technology.

Thus, the robot control system 100 or the controller of the robot (R) may specify coordinate information (e.g., area of A on the third floor (3, 1, 1)) with respect to an image acquired from the robot (R), as shown in FIG. 4B. As such, specific coordinate information may become the current location information of the robot (R) (e.g., the current location information of the robot (R) may be provided with respect to the coordinate information generated by the robot control system 100 based on the image acquired from the robot (R)).

The robot control system 100 or the controller of the robot (R) may estimate a location (or a current location) of the robot (R) by comparing the image acquired from the robot (R) with the map generated by a vision (or visual)-based SLAM technology. In this case, the robot control system 100 or the controller of the robot (R) may i) specify an image most similar to the image acquired from the robot (R) by using image comparison between the image acquired from the robot (R) and images that constitute the pre-generated or generated map, and ii) specify location information of the robot (R) by acquiring location information that is matched with the specified image.

As such, the robot control system 100 or the controller of the robot (R) may specify a location (or a current location) of the robot by using an image acquired from the robot (R) as shown in FIG. 4A. As described above, the robot control system 100 or the controller of the robot (R) may extract location information (e.g., coordinate information) corresponding to the image acquired from the robot (R), from the map information stored in the storage unit 120 (e.g., may be also referred to as "reference map").

The image control system 2000 shown in FIG. 2 may be configured to control at least one camera 20 arranged in the space 10. As shown, a plurality of cameras 20a, 20b, 20c, 20d, . . . may be arranged in the space 10. The plurality of cameras 20a, 20b, 20c, 20d, . . . may be arranged on different positions in the space 10.

Since the plurality of cameras 20a, 20b, 20c, 20d, . . . are arranged on different positions in the space 10, it is possible for the robot control system 100 to monitor an operation of the robot (R) or to check a position of a target user, by using the plurality of cameras 20a, 20b, 20c, 20d, . . . .

The image control system 2000 may provide, to the robot control system 100, information used for task performance of the robot (R), through communications with the robot control system 100. As aforementioned in the configuration of the storage unit 120, a storage unit of the image control system 2000 may be configured to store various information on the camera 20. The information on the camera 20 may be variable, and may include i) identification information of each camera (20a, 20b, 20c, 20d . . . ) (e.g., serial numbers, TAG information, QR code information, etc.), ii) arrangement position information of each camera (20a, 20b, 20c, 20d . . . ) (e.g., information on a specific position in the space where each camera (20a, 20b, 20c, 20d . . . ) is arranged), iii) information on an angle of view of each camera (20a, 20b, 20c, 20d . . . ) (e.g., information on a specific view in the space captured by each camera (20a, 20b, 20c, 20d . . . )), iv) position information on a region (or a space or a specific space) corresponding to an angle of view of each camera (20a, 20b, 20c, 20d . . . ), v) status information of each camera (20a, 20b, 20c, 20d . . . ) (e.g., a power condition, presence of a malfunction, a battery condition, etc.), vi) image information received from each camera (20a, 20b, 20c, 20d . . . ), etc.

The information on the camera 20 may exist in a matching manner on the basis of each camera (20*a*, 20*b*, 20*c*, 20*d* . . . ).

For instance, at least one of identification information of the specific camera 20*a*, position information, view angle information, status information and/or image information may exist in the storage unit of the image control system 2000 as matching information.

In the following descriptions, for convenience, it will be explained that the aforementioned information on the camera is stored in the storage unit 120, without discernment of a type of the storage unit (or storage place). That is, since the information on the camera may be stored in various storage units according to a situation, there are not any particular restrictions in some example embodiments.

According to the above descriptions, in some example embodiments, the image control system 2000 and the robot control system 100 are configured as separate configurations. However, some example embodiments are not limited to this. That is, the image control system 2000 and the robot control system 100 may be configured as a single integrated system. In this case, the image control system 2000 may be also referred to as a "camera unit".

Figure 5:
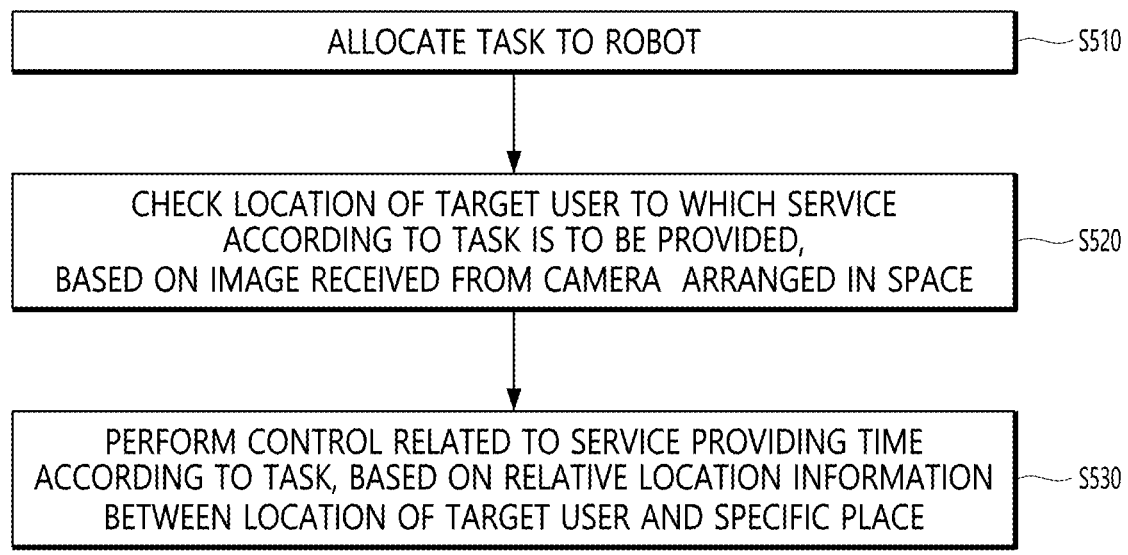
FIG. 5 is a flowchart for explaining a control method for a robot according to some example embodiments.

Hereinafter, a robot control method according to some example embodiments will be explained in more detail with reference to the aforementioned configurations, with the attached drawings. FIG. 5 is a flowchart for explaining a control method for a robot according to some example embodiments. And FIGS. 6, 7, 8A, 8B and 9 are conceptual views for explaining a control method and system for a robot according to some example embodiments.

In the robot control method according to some example embodiments, a task is allocated to the robot (S510).

In some example embodiments, "allocation of a task to the robot" means provision of a task to the robot, and more particularly, may mean input or transmission of a control command to the robot (R) such that the robot (R) performs an allocated task. In a case that a task is allocated to the robot (R), the robot (R) may include an algorithm to perform the allocated task. That is, the robot (R) may be programmed to perform the allocated task. The controller of the robot (R) may execute an operation to perform the allocated task, by the preset or alternatively given algorithm and program.

The operation of the robot to perform the allocated task may be variable.

For instance, the operation of the robot may be understood as a concept including all of an operation related to driving of the robot, an operation related to a task to be performed by the robot, an operation related to a power state of the robot, etc.

The operation related to driving of the robot may include various operations related to driving of the robot, such as a driving speed of the robot, a driving direction, a rotation direction, a rotation speed, a driving start, a driving stop and/or a driving termination.

Next, the operation related to a task to be performed by the robot may be variable according to a type of a task to be performed by the robot. For instance, if the robot (R) is a robot to provide a road guidance service, the operation related to a task to be performed by the robot may include a road search operation for road guidance, a driving operation for road guidance, etc. As another example, if the robot (R) is a robot to provide an object delivery service, the operation related to a task to be performed by the robot may include a driving operation for delivery of an object, an operation to drive a hardware of the robot for delivery of an object, etc.

Next, the operation related to a power state of the robot may include an operation to turning on or off a power (e.g., connecting or disconnecting a power source) of the robot (R), an operation to drive the robot (R) to a standby state, an operation to drive the robot (R) to a sleep mode, etc. Besides the aforementioned examples, the operation of the robot may be variable. And some example embodiments are not limited to the above examples.

Like this, the operation of the robot is variable, and the robot (R) may perform at least one of the aforementioned various operations in order to execute an allocated task.

For allocation of a task to the robot (R), a control command inputted or transmitted to the robot (R) may include at least one command to drive the robot (R) such that the robot (R) performs the allocated task.

Task allocation to the robot (R) may be executed through various paths. For instance, task allocation may be executed by the robot control system 100 according to some example embodiments. The controller 150 may be configured to allocate a task to the robot (R). For task allocation to the robot (R), the controller 150 may transmit a control command related to a task to the robot (R), by using the communication unit 110. Such a control command may include a control to perform a task by the robot (R).

The controller 150 may perform control related to driving of the robot (R), such that the robot (R) moves to a specific place matched with a task. The controller 150 may transmit a control command corresponding to a task to the robot (R), thereby controlling the robot (R) to move to a specific place matched with the task.

The control command corresponding to a task allocated to the robot (R) may include task information. As aforementioned, the task information may include information related to at least one of a task type, an operation according to a task, information on a target user to which a task is to be performed, a task performance place (or a specific place matched with a task) and/or a scheduled time for task performance.

When the robot (R) receives the control command corresponding to a task from the controller 150, the robot (R) may move to a specific place matched with the task, in order to perform the allocated task, based on the task information. The controller of the robot (R) may move to the place for task performance, based on the task information received from the robot control system 100.

Allocation of a task to the robot (R) may be performed based on an input of task information to the robot (R). In this case, the robot (R) may receive the task information through a configuration of the input unit provided at the robot (R). A subject which inputs the task information through the input unit of the robot (R) may be a person or another robot different from the robot to which a task is allocated.

Like this, task allocation to the robot (R) may be performed in various manners. The robot (R) may execute an operation for task performance, based on task allocation.

As aforementioned, a task allocated to the robot (R) may be a task to provide a service to a user. In this case, the robot (R) may be configured to directly meet a user to which a service is to be performed (hereinafter, will be referred to as a "target user") in the space 10, and to provide a service to the target user.

The robot (R) may move to a specific place in order to perform a task to the target user (or a service according to the task), based on task information.

The robot (R) may move to the specific place based on information related to the allocated task. The controller 150 may control the robot (R) such that the robot (R) moves to the specific place corresponding to the task information.

As aforementioned, the task information may include information related to at least one of a task type, an operation according to a task, information on a target user to which a task is to be performed, a task performance place (or a specific place matched with a task) and/or a scheduled time for task performance.

For task performance, the robot (R) may move to a specific place matched with a task until a scheduled time for task performance, based on task information.

The controller 150 may control the robot (R) such that the (R) moves to a specific place matched with a task until a scheduled time for task performance, based on the task information.

The scheduled time for task performance may be expressed as a "predetermined time" (e.g., a predetermined or alternatively, given time) or a "reservation time". Such a predetermined time or reservation time may be determined based on a selection by the target user, or a control of the robot control system 100. For instance, the target user may perform a reservation that the robot (R) is to perform a specific task (e.g., a logistics delivery task) for the target user, to the robot control system 100. The target user may input a service provision time according to a specific task (e.g., 3:00 PM), to the robot control system 100, through an electronic device. Such a specific time may be expressed as the aforementioned "predetermined time" or "reservation time". Also, it is possible that the target user directly transmits scheduled time information to the robot (R) through the electronic device, without via the robot control system 100.

The robot (R) may be programmed to receive information on a scheduled time for task performance through various paths, and to perform a task at the corresponding time.

Further, a specific place for task performance may be also set in various manners. For instance, once a target user to which a service is to be performed is specified, the controller 150 may extract place information such as a working place or a dwelling place of the target user, based on the aforementioned DB. Then, the controller 150 may set a place related to the extracted place information, as a specific place (or a destination) for task performance. As another example, the specific place for task performance may be also specified based on information received from the target user.

Once the robot (R) receives information on the specific place for task performance through various paths, the robot (R) may be programmed to move up to the specific place for task performance. The robot (R) may perform driving by regarding the specific place as a "destination".

Upon allocation of a task, the robot (R) may move to the specific place until an expected time, or until a time prior to the expected time by a preset or alternatively, given time (e.g., 2:50 PM in a case that the expected time is 3:00 PM), for task allocation.

The controller 150 may control the robot (R) to move to the specific place until the expected time, for performance of the allocated task. The controller 150 may perform control over driving of the robot (R).

In the robot control method according to some example embodiments, a location of a target user to which a service according to a task is to be provided may be certified based on an image received from the camera arranged in the space (S520).

Once the target user is specified, the controller 150 may receive an image from the camera arranged in the space 10, and may recognize the target user and extract location information of the target user, based on the received image. The controller 150 may check (e.g., determine) a current location of the target user in the space 10, at a time prior to an expected time for task performance by a preset or alternatively, given time. This is in order to check whether the target user is able to arrive at a specific place matched with a task until the expected time, as the controller 150 checks the current location of the target user at a time prior to the expected time by a preset or alternatively, given time.

A length (duration) of the preset or alternatively, given time may be differently set according to a situation.

Figure 6:
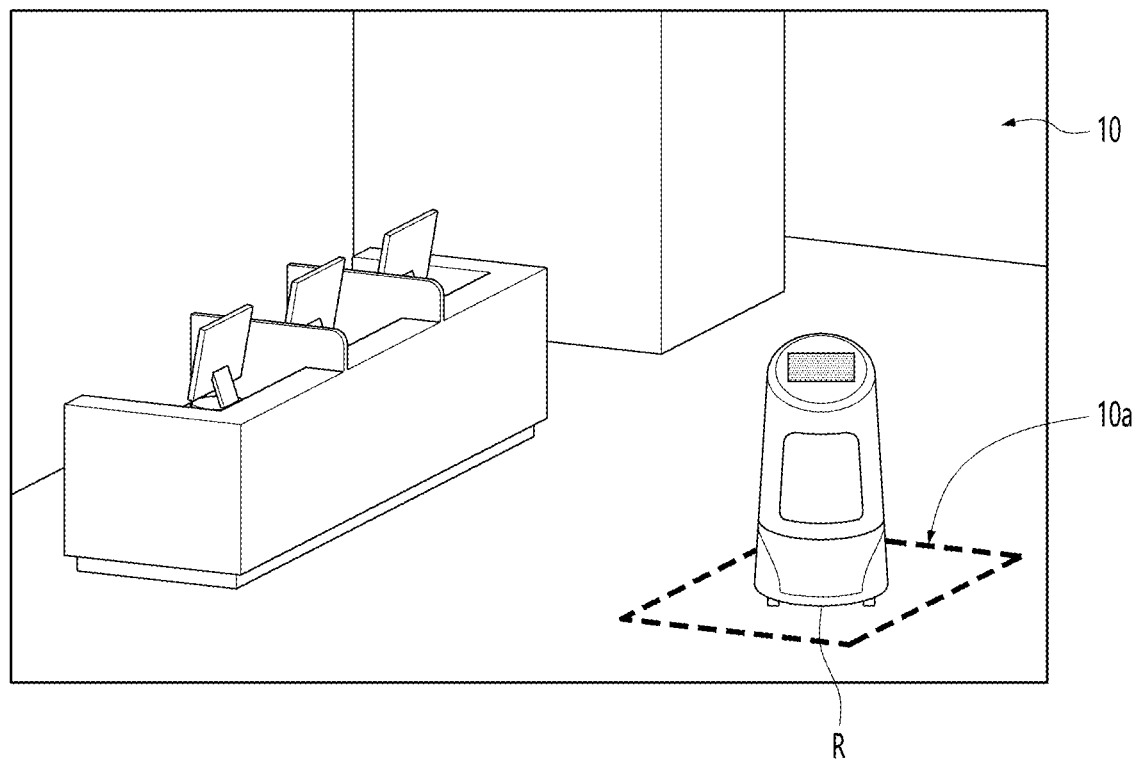

As shown in FIG. 6, the robot (R) may be in a state of having arrived at the specific place matched with a task, or a state of moving to the specific place.

Figure 7:
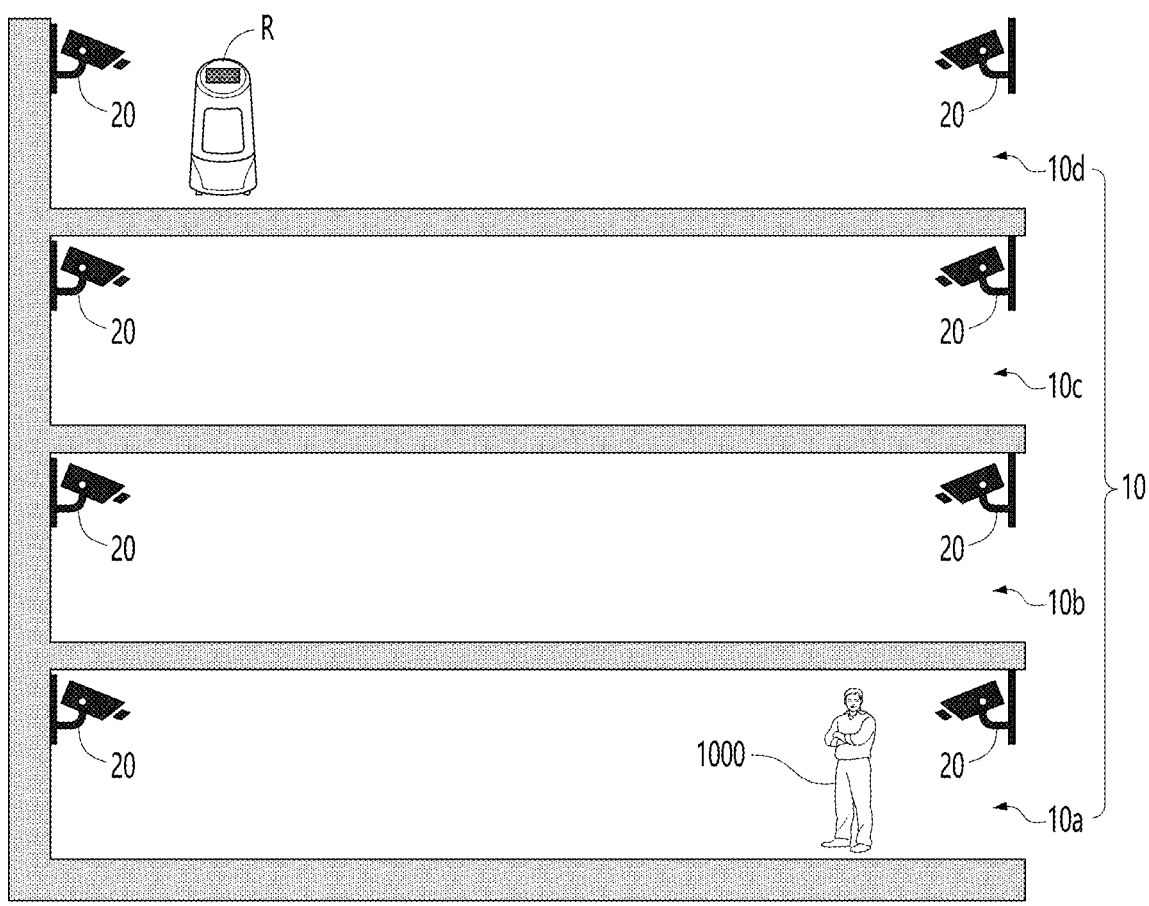

In some example embodiments, a method to check a location of a target user may be various. More specifically, as shown in FIG. 7, the controller 150 may extract a target user 1000 from an image received through the camera 20 arranged in the space 10. The controller 150 may specify (e.g., determine) an image including a facial image corresponding to the target user 1000, from a plurality of images arranged in the space 10, by using a face recognition algorithm. The facial image of the target user 1000 may exist at a user DB stored in the storage unit 120.

Once the image including a facial image corresponding to the target user 1000 is specified, the controller 150 may specify (e.g., determine) an arrangement place of the camera which has captured the specific image, as a location (or a current location) of the target user.

As aforementioned, in the storage unit 120, there may exist location information of an arrangement place of the camera, together with identification information of the camera, in a matching manner. Thus, the controller 150 may extract location information matched with identification information of the camera which has captured the image, from the storage unit 120, and may specify the extracted location information as a location of the target user.

The location of the target user 1000 may be obtained by recognizing an identification mark of the target user 1000. The controller 150 may recognize an identification mark of the target user 1000 through the communication unit 110. Further, the controller 150 may recognize an identification mark by using a scan unit which scans identification marks arranged in the space 10, or by using a recognition unit which recognizes identification marks. Such identification marks may have a configuration to be recognizable through communications, such as an antenna (e.g., an NFC antenna, etc.), a barcode and/or a QR code. Such identification marks may be configured as an entrance card of a specific company, etc. In the storage unit 120, there may exist location information about an arrangement place of the scan unit or the recognition unit, together with identification information of the scan unit or the recognition unit which has recognized the identification marks, in a matching manner. Thus, the controller 150 may extract, from the storage unit 120, location information matched with identification information of the scan unit or the recognition unit which has recognized the identification marks, and may specify as a location of the target user.

As another example, the location of the target user 1000 may be obtained by recognizing an electronic device of the target user 1000. The electronic device may include a portable phone (or a smartphone) of the target user 1000. Such an electronic device is an electronic device pre-registered or registered to a user DB, and identification information corresponding to an electronic device of the target user 1000 may be stored in information related to the target user 1000 according to the user DB. The controller 150 may recognize an electronic device of the target user 1000 by using the communication unit 110.

In the storage unit 120, there may exist location information of an arrangement place of the communication unit, together with identification information of the communication unit which has communicated with an electronic device with a strongest signal strength, in a matching manner. Thus, the controller 150 may extract location information matched with identification information of the communication unit which has communicated with the electronic device with a strongest signal strength, from the storage unit 120, and may specify the extracted location information as a location of the target user.

Like this, in some example embodiments, once the location information of the target user is certified (specified, determined, etc.), control related to a task performance time may be performed based on relative location information between the location of the target user and a specific place for task performance (S530).

As aforementioned, the task performance time may mean a scheduled time to perform a task by the robot (R) (or a scheduled time to meet the target user).

The relative location information may include distance information corresponding to a distance between the location (or the current location) of the target user certified in operation S520 and the specific place. The relative location information is information about a distance of the target user 1000 from the specific place, and may include at least one of horizontal distance information and/or vertical distance information.

The horizontal distance information may mean information about a distance of the target user 1000 from the specific place, under an assumption that the target user 1000 and the specific place exist on the same vertical level (e.g., floor) or similar vertical levels. The horizontal distance information may be expressed as a unit of meters, etc.

Further, the vertical distance information may mean information about the number of floors corresponding to a distance of the target user 1000 from the specific place, under an assumption that the target user 1000 and the specific place exist on different floors. The vertical distance information may be expressed as the number of floors obtained by deducting the number of floors where the target user 1000 is positioned, from the number of floors where the specific place is positioned. For instance, as shown in FIG. 7, the space 10 may consist of a plurality of different regions 10a, 10b, 10c, 10d, . . . (e.g., floors). In this case, the target user 1000 may be located on the first region 10a (e.g., first floor), and the specific place may be located on the fourth region 10d (e.g., fourth floor). The relative location information between the target user 1000 and the specific user (more specifically, the vertical distance information) may correspond to three floors.

Like this, once the location of the target user 1000 is certified, the controller 150 may calculate the relative location information between the target user 1000 and the specific user, based on the certified location information. And the controller 150 may determine whether to control the robot (R) to perform a task allocated to the robot (R) by exceeding a scheduled time for task performance, based on the relative location information including at least one of the vertical distance information and the horizontal distance information.

The robot (R) may be programmed to wait for the target user 1000 at the specific place, only until the scheduled time for task performance, before being controlled to perform the task by exceeding the scheduled time.

If a service for the task (e.g., object delivery) is not provided to the target user 1000 until the scheduled time, the robot (R) may return to a preset or alternatively, given place without waiting for the target user 1000, regardless of completion of task performance. In this case, it may be expressed that the task allocated to the robot (R) has been cancelled.

Thus, performing the task by exceeding the scheduled time by the robot (R) may mean that the robot (R) is positioned at the specific place matched with the task, until a time after the scheduled time.

That is, if the robot (R) is controlled to perform the task by exceeding the scheduled time, the robot (R) may wait for the target user 1000 at the specific place.

The robot (R) may perform the allocated task by exceeding the scheduled time, based on a control command received from the robot control system 100. That is, the controller of the robot (R) may be positioned at the specific place based on a control command received from the robot control system 100, even if the scheduled time has lapsed. The robot (R) may be in a state of one of a standby mode, a power saving mode and/or a sleep mode.

A method to control the robot (R) to perform a task allocated to the robot (R) by exceeding a scheduled time for task performance will be explained in more detail.

The controller may set an additional task performance time for the scheduled time (e.g., may extend the scheduled time by an additional task performance time), based on various standards. The "additional task performance time" may be also expressed as an "additional waiting time". The "additional waiting time" is a time exceeded from the preset or alternatively, given scheduled time for task performance, and may be specified as 10 minutes, 20 minutes, etc. For instance, if the scheduled time for task performance is 3:00 PM and the additional waiting time is 10 minutes, the robot (R) may be positioned at the specific place until 3:10 PM in order to meet the target user (or to provide a service according to the task to the target user).

A method to set an additional task performance time will be explained in more detail. The controller 150 may set an additional task performance time with respect to the scheduled time, if a distance between the target user and the specific place is within a reference range.

The distance between the target user and the specific place may be specified based on at least one of the aforementioned horizontal distance information and vertical distance information.

The controller 150 may perform control related to the additional task performance time, such that the robot (R) performs the task for the additional task performance time by exceeding the scheduled time. As aforementioned, the control related to the additional task performance time may include control for the robot (R) to wait for the additional task performance time at the specific place by exceeding the scheduled time, after arriving at the specific place.

As shown in FIGS. 8A and 8B, in the storage unit 120, there may exist various guide information for setting the additional task performance time. The controller 150 may set the additional task performance time based on guide information and relative location information (e.g., a distance between the location of the target user and the specific place) stored in the storage unit.

A length (or a time length, duration) of the additional task performance time may be differently set according to a distance between the location of the target user and the specific place.

For instance, as shown in FIG. 8A, if the distance between the location of the target user and the specific place is "within 10 meters on the same floor", the length of the additional task performance time may be set as "5 minutes". The controller 150 may transmit information on the additional task performance time to the robot (R). The robot (R) may maintain a standby state at the specific place so as to perform the allocated task, for the additional task performance time by exceeding the preset or alternatively, given scheduled time for task performance, based on the information on the additional task performance time received from the controller 150.

As another example, as shown in FIG. 8A, if the distance between the location of the target user and the specific place is "within 5 floors", the length of the additional task performance time may be set as "10 minutes". That is, as the distance between the location of the target user and the specific place is increased, it takes a long time for the target user to move to the specific place. Thus, a length of the additional task performance time may be differently set according to a distance between the target user and the specific place.

In this case, the controller 150 may transmit information on the additional task performance time to the robot (R). The robot (R) may maintain a standby state at the specific place so as to perform the allocated task, for the additional task performance time by exceeding the preset or alternatively, given scheduled time for task performance, based on the information on the additional task performance time received from the controller 150.

If the distance between the target user and the specific place is out of the reference range, the task allocated to the robot (R) may be cancelled.

For instance, as shown in FIG. 7, the specific place may be located at the specific region 10d (e.g., on the specific floor) among the plurality of regions 10a, 10b, 10c, 10d (e.g., floors) which constitute the space 10. The reference range may be set on the basis of "floor". The controller 150 may check a floor (e.g., a target floor) where the target user is located among the plurality of floors, and may not set the additional task performance time if the floor where the target user is located is different from a floor where the specific place is located.

Also, if a floor-to-floor distance between the target user and the specific place is out of the reference range, the additional task performance time may not be set.

For instance, as shown in FIG. 8A, if the distance between the target user and the specific place exceeds "five floors", the controller 150 may transmit a control command for task cancel to the robot (R) such that the task allocated to the robot (R) is cancelled. In this case, the robot (R) may return to a preset or alternatively, given place without completing the task. If the distance of the target user from the specific place is out of the reference range, the controller 150 may determine that the target user is unable to arrive at the specific place within the preset or alternatively, given scheduled time for task performance.

The controller 150 may control the robot (R) to return to the preset or alternatively, given place before the scheduled time for task performance. In this case, the robot (R) may return to the preset or alternatively, given place without waiting until the scheduled time at the specific place. Alternatively, the controller 150 may also control the robot (R) to wait for the target user at the specific place until the scheduled time. That is, the aforementioned control command for task cancel may include one of the above two situations.

The controller 150 may perform control related to the additional task performance time based on situation information of the target user, as well as (or instead of) the distance between the target user and the specific place. That is, even if the distance between the target user and the specific place is short, there may occur a case that the target user is unable to reach the specific place until the scheduled time for task performance and the additional task performance time (e.g., the scheduled time for task performance extended by the additional task performance time), according to a current situation of the target user.

The situation information of the target user may be collected through various paths.

For instance, the controller 150 may not only recognize the target user, but also extract at least one of behavior information of the target user and/or characteristic information of a place where the target user is located, from an image received from the camera 20 arranged in the space 10. For instance, as shown in FIG. 8B, from the image, the controller 150 may check situation information of the target user, such as i) moving towards the specific place, ii) under (e.g., engaged in) conversations with a third party, iii) under (e.g., engaged in) a meeting at a conference room, etc. And the controller 150 may predict a probability that the target user will be unable to reach the specific place until the scheduled time for task performance and (e.g., extended by) the additional task performance time, based on situation information of the target user. Thus, even if the distance between the target user and the specific place is within the reference range, the controller 150 may not set the additional task performance time based on situation information of the target user. For instance, as shown in FIG. 8B, if a situation of the target user is analyzed as "moving towards the specific place", the additional task performance time (or waiting time) may be set. As shown in FIG. 8B, if a situation of the target user is analyzed as "under a meeting at a conference room", the additional task performance time (or waiting time) may not be set, even in a case that the distance of the target user from the specific place is within the reference range.

The controller 150 may analyze user's situation information based on user's schedule information stored in the user DB. For instance, the controller 150 may extract meeting termination time information from user's situation information. If the extracted meeting termination time information is within the scheduled time for task performance or within the settable additional task performance time, the controller 150 may set an additional task performance time based on the user's schedule information.

In a case that situation information of the target user indicating that the target user is moving towards the specific place is obtained, the additional task performance time may be set, even if the distance between the target user and the specific place is out of the reference range. This is in order to reflect an intention of the target user who wishes to be provided with a service according to the task. In this case, the controller 150 may set the additional task performance time with consideration of an expected time to perform another task pre-allocated or allocated to the robot (R).

In some example embodiments, the length of the additional task performance time may be set with consideration of only a situation of the target user. However, in some example embodiments, the length of the additional task performance time may be set with consideration of a schedule of the robot (R). The controller 150 may check another task preset or alternatively given to the robot (R), and may calculate a maximum additional task performance time (or highest additional task performance time) allowed to the robot (R). Then, the controller 150 may set the additional task performance time within the maximum additional task performance time (or highest additional task performance time).

In order to provide a service to the target user, the controller 150 may transmit notification information to an electronic device of the target user, at a time when the robot (R) to which a task has been allocated starts to move to the specific place, or at a time prior to the scheduled time for task performance by a preset or alternatively, given time. Such notification information may include information indicating that the robot (R) is moving to the specific place or the robot (R) is positioned at the specific place.

The controller 150 may receive, from the electronic device of the target user, information on at least one of an expected time to arrive at the specific place and whether the target user is able to arrive or not. And the controller 150 may perform control related to the additional task performance time (e.g., a determination of a length of the additional task performance time, a determination whether to set the additional task performance time or not, etc.), based on the information received from the electronic device of the target user.

The controller 150 may receive, from the robot (R), state information including an arrival at the specific place to perform the task. The controller 150 may check the location of the target user based on the reception of such state information, and may perform the aforementioned controls.

Further, in some example embodiments, the additional task performance time may be set to the robot (R) under control of the robot control system 100. However, in some example embodiments, the additional task performance time may be set by the controller of the robot (R).

The robot (R) may include a communication unit to receive task information on a task to be performed from the robot control system 100; a driving unit to move to an expected specific place for performance of the task; and a controller to receive location information of a target user to which the task is to be performed, from the robot control system, and to calculate a distance between the target user and the specific place based on the location information of the target user. And the controller of the robot (R) may also set an additional task performance time such that the robot (R) performs the task by exceeding the scheduled time, if the distance between the target user and the specific place is within a reference range. Methods to calculate a distance between the target user and the specific place (i), and thereby to set an additional task performance time (ii) are the same as, or similar to, the configurations executed by the aforementioned controller 150 of the robot control system 100. Thus, detailed explanations thereof will be omitted. That is, the aforementioned operations discussed as being performed by the controller 150 of the robot control system 100 may be understood as being performable by the controller of the robot (R). According to some example embodiments, the driving unit may include a motor and/or servo connected to a power source, and may be controlled by the controller of the robot (R). According to some example embodiments, the communication unit of the robot (R) may be the same as or similar to the communication unit 110.

Further, the controller of the robot (R) may set the additional task performance time by receiving at least one of location information of the target user (i), and relative location information between the target user and the specific place, from the robot control system 100.

In case of waiting for the target user 1000 at the specific place, the robot (R) may be located at a preset or alternatively given region 10*a* (or a preset or alternatively given waiting region) of the specific place. The preset or alternatively given region 10*a* may be a region not to interrupt person's passing (e.g., refer to 10*a* of FIGS. 6 and 10*a* of FIGS. 9A and 9B). The controller of the robot (R) may receive an image about the specific place by using the camera provided at the robot (R), and may determine the waiting region (the preset or alternatively given region 10*a*) to wait for the target user. Information about standards to set such waiting region 10*a* may be pre-stored or stored in the storage unit of the robot (R) or the robot control system 100. For instance, there may exist standards to set the waiting region 10*a*, such as "waiting with an interval more than a preset distance from a door" and "waiting near a wall". It is also possible to set such a location of the waiting region by the controller 150 of the robot control system 100.

In a case that the robot (R) has arrived at the specific place for task performance, the controller of the robot (R) may control the robot (R) to be located at the waiting region 10*a*.

In a case that the robot (R) has completed to move to the specific place, the controller of the robot (R) may control the driving unit of the robot (R) such that driving within the waiting region 10*a* of the specific place is stopped. The robot (R) may execute an operation to wait for the target user at the waiting region 10*a*. An operation state of the robot (R) may be a power-off state that an output unit such as the display unit is powered off, a sleep mode to operate in a minimum power or low power usage mode, a standby mode or a power-saving mode.

Figure 9A:
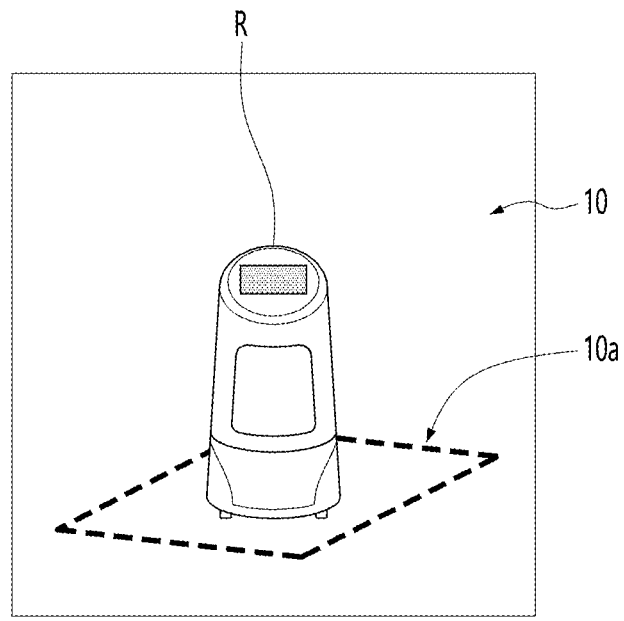
Figure 9B:
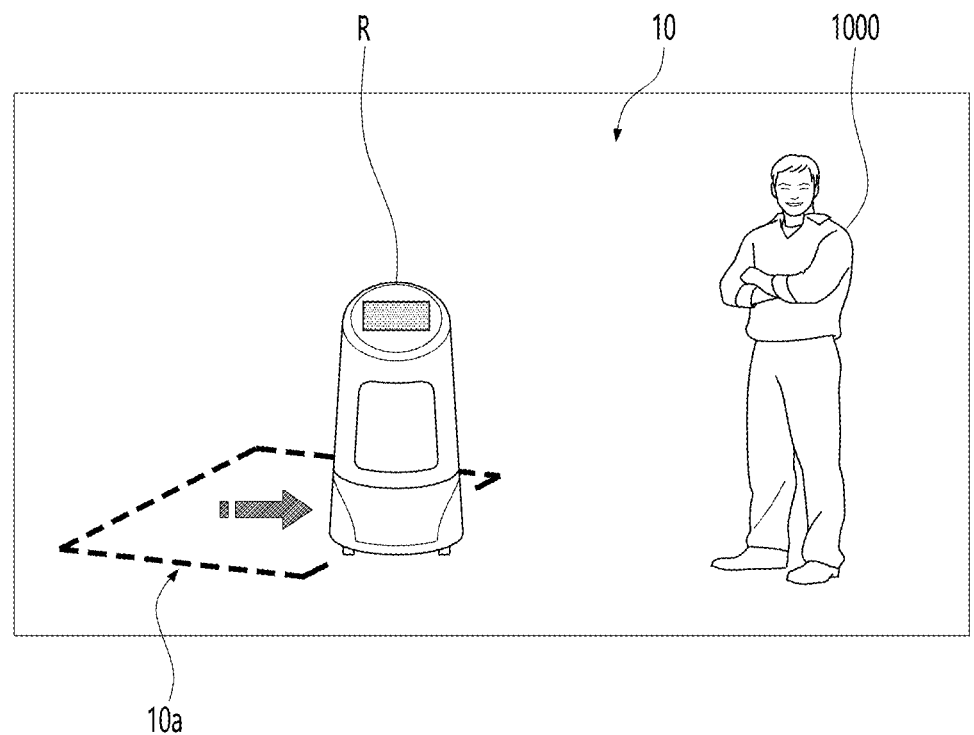

The controller of the robot (R) may monitor a peripheral situation of the robot (R) in such an operation state, at preset or alternatively given time intervals or real time, by using the camera provided at the robot (R). The robot (R) may collect an image about the peripheral situation through the camera, and may recognize the target user 1000 from the collected image as shown in FIG. 9B. In case of checking that the target user 1000 has arrived at (has entered or is positioned at) the specific place, the controller of the robot (R) may start to drive towards the target user 1000. The controller of the robot (R) may start to drive towards the target user 1000 with a speed less than a preset or alternatively given speed. Further, the controller of the robot (R) may output identification information (e.g., a name) of the target user 1000 through the display unit and/or a speaker. Thus, the target user 1000 may easily recognize the robot (R) which is to perform a service for himself or herself.

In a case that user authentication with respect to the target user 1000 may be completed through a user authentication process to authenticate the target user 1000, the controller of the robot (R) may perform a task for the target user 1000. The controller of the robot (R) may perform an authentication with respect to the target user 1000 by using at least one of various authentication methods such as a face recognition, a fingerprint recognition, a voice recognition, a password input and/or an identification mark scan. That is, the controller of the robot (R) may prevent the allocated task from being executed for a third party unrelated to the task, or reduce the occurrence or probability thereof, through an authentication process to authenticate a user who has accessed the robot (R) is a substantial user corresponding to the target user matched with the allocated task.

In a case that the user authentication is completed (e.g., successfully completed), the controller of the robot (R) may provide a service corresponding to the task to the target user 1000. For instance, if the allocated task is object delivery, the controller of the robot (R) may control a storage box of the robot (R) to be open, such that the target user 1000 is able to (and may) take an object out. Through this process, the controller of the robot (R) may complete performance of the task for the target user 1000.

In some example embodiments, a method to perform user authentication may use the camera provided at the robot (R). However, some example embodiments are not limited to this. In some example embodiments, user authentication is performed by using not only the camera provided at the robot (R), but also the camera arranged in the space. This allows the target user 1000 to which a task is to be performed to be authenticated.

In some example embodiments, the controller 150 may transmit an image acquired from the camera arranged in the space to the robot (R) by using the communication unit 110. The controller of the robot (R) may perform user authentication to authenticate the aforementioned target user 1000, based on the image received from the robot control system 100.

In some example embodiments, the controller 150 may perform user authentication by using an image acquired from the camera arranged in the space, and may transmit a result of the authentication to the robot (R). The controller 150 may transmit, to the robot (R), information indicating that the authentication of the target user 1000 has been completed. The controller of the robot (R) may perform a task to the target user 1000, based on the information received from the robot control system 100.

In this case, the controller 150 may acquire a facial image of the user, from the image acquired from the camera arranged in the space where the robot (R) is located. The controller 150 may select a camera to which the robot (R) is approaching or a camera closest to the robot (R), among the plurality of cameras arranged in the space.

Then, the controller 150 may perform authentication with respect to the target user 1000 by determining whether the acquired facial image corresponds to the target user 1000, through analysis of the facial image acquired from the camera arranged in the space.

The controller 150 may determine whether a user corresponding to the acquired facial image is the target user 1000 or not, by referring to user DB (database).

Like this, in some example embodiments, the target user 1000 may be efficiently authenticated by utilizing not only the camera provided at the robot (R) but also the camera arranged in the space. This may prevent a task allocated to the robot (R) from being performed by a third party irrelevant to the task, or reduce the occurrence or probability thereof.

As aforementioned, in the robot control method and system according to some example embodiments, a user's location may be certified by using the camera installed in the space, and control over a task execution time may be performed based on a distance between the user and a task execution place.

In the robot control method and system according to some example embodiments, in a case that the user's location is not far from the task execution place, the robot may be controlled to complete the task for the user by waiting for the user, even if a scheduled time expected to perform the task lapses.

Thus, the robot may complete the task for the user by waiting for the user for an additional waiting time. Further, in the robot control method and system according to some example embodiments, as the robot allocated with the task is controlled to complete performance of the task, the robot may be efficiently operated.

Conventional devices for controlling a robot to provide a service to a user cause the robot to cancel the service if the user does not arrive at a service location within a scheduled time. In such a case, the robot leaves the service location and the user re-schedules the service to cause the robot to re-attempt to provide the service. Accordingly, in circumstances in which the user is nearby the service location at the expiration of the scheduled time, the user experiences excessive delay and inconvenience in re-scheduling the service, and the robot consumes excessive resources (power, delay, processor, memory, bandwidth, etc.) in processing the re-scheduling and returning back to the service location.

However, according to some example embodiments, improved devices and methods are provided for controlling a robot to provide a service to a user. For example, the improved devices and methods may adjust (e.g., extend) a performance time of a scheduled service based on a situation of the user (e.g., a location of the user). Accordingly, in circumstances in which the user is nearby the service location at the expiration of the scheduled time, the scheduled time may be extended to permit delayed performance of the scheduled service without rescheduling the service. Thus, the improved devices and methods overcome the deficiencies of the conventional devices to avoid the rescheduling of the service, and thereby reduce the delay and inconvenience experienced by the user, and reduce the resource consumption (power, delay, processor, memory, bandwidth, etc.) of the robot.

According to some example embodiments, operations described herein as being performed by the robot control system 100, the controller 150, communication unit 110, the display unit 130, the input unit 140, the external server 200, the image control system 2000, the cloud server 210, the electronic device of the user, the device of the user or the manager, the control room 100a, the robot (R), the controller of the robot (R), the driving unit and/or the communication unit of the robot (R) may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

One or more of the aforementioned operations may be executed by one or more processes in a computer, and may be implemented as a program which may be stored in a computer-readable medium.

Further, one or more of the aforementioned operations may be implemented using a computer-readable code or instruction word (e.g., a program) stored in a program-recorded medium.

The computer-readable medium (e.g., the storage unit 120, the database 220, etc.) may include all types of recording devices for storing data which may be read by a computer system. Examples of the computer-readable medium (e.g., the storage unit 120, the database 220, etc.)

include a Hard Disk Drive (HDD), a Solid State Disk (SSD), a Silicon Disk Drive (SDD), Read-Only Memory (ROM), Random Access Memory (RAM), Compact Disk ROM (CD-ROM), a magnetic tape, a floppy disk, an optical data storage device, etc.

Further, the computer-readable medium may include a storage unit which may be a server and/or a cloud storage unit to which an electronic device may access through communications. In this case, the computer may download a program configured to implemented one or more of the aforementioned operations from the server and/or the cloud storage unit, through wired and/or wireless communications.

Further, in some example embodiments, the aforementioned computer may be an electronic device where a processor, e.g., a Central Processing Unit (CPU) is mounted, and there is no limitation in a type of the computer.

The foregoing examples are not to be construed as limiting some example embodiments. The scope of some example embodiments should be determined by reasonable interpretations of the appended claims, and all changes and modifications that fall within the metes and bounds of the claims, or equivalents of such metes and bounds are therefore intended to be embraced by the appended claims.

What is claimed is:

1. A robot control method, comprising:
   allocating a task to a robot, the task associated with a place and a target user;
   determining a location of the target user based on an image received from a camera, the camera being arranged in a space including the place; and
   controlling a performance time of the task based on the location of the target user and the place,
   wherein the performance time of the task is based on a scheduled time at which the robot is scheduled to perform the task and
   wherein the controlling the performance time includes determining whether to extend the performance time of the task based on the location of the target user and the place.

2. A robot control method, comprising:
   allocating a task to a robot, the task associated with a place and a target user;
   determining a location of the target user based on an image received from a camera, the camera being arranged in a space including the place; and
   controlling a performance time of the task based on the location of the target user and the place,
   wherein
   the performance time of the task is based on a scheduled time at which the robot is scheduled to perform the task;
   the controlling the performance time includes extending the performance time by an additional task performance time based on a distance between the location of the target user and the place being within a reference range; and
   the method further comprises controlling the robot to perform the task during the extended performance time.

3. The method of claim 2, wherein the controlling the robot comprises controlling the robot to wait for the extended performance time at the place after arriving at the place.

4. The method of claim 3, wherein a length of the additional task performance time is set according to a distance between the location of the target user and the place.

5. The method of claim 3, further comprising:
   cancelling the task based on the distance between the target user and the place being outside of the reference range.

6. The method of claim 2, wherein
   the place is located on a specific floor among a plurality of floors included in the space;
   the determining the location of the target user includes determining a target floor among the plurality of floors on which the target user is located based on the image; and
   the controlling the performance time includes determining not to extend the performance time of the task by the additional task performance time based on the target floor being different from the specific floor.

7. A robot control method, comprising:
   allocating a task to a robot, the task associated with a place and a target user;
   determining a location of the target user based on an image received from a camera, the camera being arranged in a space including the place; and
   controlling a performance time of the task based on the location of the target user and the place,
   wherein
   the performance time of the task is based on a scheduled time at which the robot is scheduled to perform the task; and
   the determining the location of the target user is performed at a time prior to the scheduled time.

8. A robot, comprising:
   a driving unit configured to move the robot to a place associated with a task; and
   a controller configured to,
   receive location information of a target user from a remote control system, the target user corresponding to the task,
   calculate a distance between the target user and the place based on the location information, and
   extend a scheduled time for performing the task by an additional task performance time based on the distance being within a reference range.

9. The robot of claim 8, further comprising:
   a camera,
   wherein the controller is configured to,
   control the driving unit to stop driving within a region of the place after the robot has completed moving to the place, and
   control the driving unit to move the robot toward the target user based on the target user being recognized using the camera.

10. A robot control system, comprising:
    a communication unit configured to communicate with a robot; and
    a controller configured to,
    allocate a task to the robot, the task associated with a place and a target user,
    determine a location of the target user based on an image received from a camera, the camera being arranged in a space including the place, and
    control a performance time of the task based on the location of the target user and the place,
    wherein the performance time of the task is based on a scheduled time at which the robot is scheduled to perform the task and wherein the controlling the performance time includes determining whether to extend the performance time of the task based on the location of the target user and the place.

11. The robot control system of claim 10, wherein
the performance time of the task is based on a scheduled time at which the robot is scheduled to perform the task; and
the controller is configured to,
control the performance time of the task including extending the performance time by an additional task performance time based on a distance between the location of the target user and the place being within a reference range, and
control the robot to perform the task during the extended performance time.

12. The robot control system of claim 11, wherein the controller is configured to control the robot to wait for the extended performance time at the place after arriving at the place.

13. The robot control system of claim 12, wherein a length of the additional task performance time is set according to a distance between the location of the target user and the place.

14. The robot control system of claim 12, wherein the controller is configured to cancel the task based on the distance between the target user and the place being outside of the reference range.

15. The robot control system of claim 11, wherein
the place is located on a specific floor among a plurality of floors included in the space; and
the controller is configured to,
determine the location of the target user including determining a target floor among the plurality of floors on which the target user is located based on the image, and
control the performance time including determining not to extend the performance time of the task by the additional task performance time based on the target floor being different from the specific floor.

16. The robot control system of claim 10, wherein
the performance time of the task is based on a scheduled time at which the robot is scheduled to perform the task; and
the controller is configured to determine the location of the target user at a time prior to the scheduled time.

17. The method of claim 1, further comprising:
controlling the robot to perform the task at the place during the performance time, the task including performing a service for the target user.

18. The method of claim 17, wherein
the service is an object delivery service; and
the controlling the robot to perform the task includes controlling the robot to open a storage box containing an object.

* * * * *